(12) United States Patent
Ganahl et al.

(10) Patent No.: US 10,759,465 B2
(45) Date of Patent: Sep. 1, 2020

(54) STEERING COLUMN FOR A MOTOR VEHICLE

(71) Applicants: THYSSENKRUPP PRESTA AG, Eschen (LI); thyssenkrupp AG, Essen (DE)

(72) Inventors: Johannes Ganahl, Schruns (AT); Martin Fleischer, Balgach (CH); Adrian Geiger, Balgach (CH); Ciprian Paltinisanu, Eschen (LI)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 55 days.

(21) Appl. No.: 16/324,814

(22) PCT Filed: Aug. 3, 2017

(86) PCT No.: PCT/EP2017/069663
§ 371 (c)(1),
(2) Date: Feb. 11, 2019

(87) PCT Pub. No.: WO2018/029076
PCT Pub. Date: Feb. 15, 2018

(65) Prior Publication Data
US 2019/0176870 A1 Jun. 13, 2019

(30) Foreign Application Priority Data
Aug. 9, 2016 (DE) .................. 10 2016 214 709

(51) Int. Cl.
*B62D 1/19* (2006.01)
*B62D 1/184* (2006.01)
*B62D 1/185* (2006.01)

(52) U.S. Cl.
CPC ............. *B62D 1/195* (2013.01); *B62D 1/184* (2013.01); *B62D 1/185* (2013.01)

(58) Field of Classification Search
CPC ......... B62D 1/195; B62D 1/184; B62D 1/185
See application file for complete search history.

(56) References Cited

U.S. PATENT DOCUMENTS 5,520,416 A * 5/1996 Singer, III ............. B62D 1/181
  280/775
5,706,704 A * 1/1998 Riefe ..................... B62D 1/195
  188/371

(Continued)

FOREIGN PATENT DOCUMENTS

DE   602004012021 T    3/2009
DE   102008034807 B   10/2009

(Continued)

OTHER PUBLICATIONS

English Translation of International Search Report issued in PCT/EP2017/069663, dated Nov. 9, 2017.

*Primary Examiner* — Darlene P Condra
(74) *Attorney, Agent, or Firm* — thyssenkrupp North America, LLC (57) ABSTRACT

A steering column includes a steering spindle rotatably mounted in an inner casing tube, which is disposed in an outer casing unit, and a clamping device that selectively secures the outer casing unit in a longitudinal direction. The clamping device includes a locking element, which in a fixing position is non-displaceably connected to an engagement part connected to the inner casing tube, which in a release position is released from the engagement part and permits movement of the inner casing tube relative to the outer casing unit. The inner casing tube and the outer casing unit are coupled by an energy absorption device. The engagement part includes a first driver element and a con- (Continued)

necting part with a second driver element. The engagement part and the connecting part are connected to each other in the longitudinal direction via the coupling device in a releasable manner.

12 Claims, 5 Drawing Sheets

(56) References Cited

U.S. PATENT DOCUMENTS

| | | | |
|---|---|---|---|
| 7,325,834 B2* | 2/2008 | Manwaring | B62D 1/195 |
| | | | 280/777 |
| 9,533,699 B2* | 1/2017 | Chiba | B62D 1/195 |
| 10,023,222 B2* | 7/2018 | Tinnin | B62D 1/192 |
| 2003/0102658 A1* | 6/2003 | McCarthy | F16F 7/128 |
| | | | 280/777 |
| 2007/0194563 A1 | 8/2007 | Menjak | |
| 2008/0111383 A1* | 5/2008 | Van Ravenhorst | E05C 3/044 |
| | | | 292/194 |
| 2015/0375773 A1 | 12/2015 | Tinnin | |

FOREIGN PATENT DOCUMENTS

| | | |
|---|---|---|
| DE | 102015204476 B | 5/2016 |
| EP | 2259957 A | 12/2010 |
| EP | 3028926 A | 6/2016 |
| GB | 2059006 A | 4/1981 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2017/069663, filed Aug. 3, 2017, which claims priority to German Patent Application No. DE 10 2016 214 709.9, filed Aug. 9, 2016, the entire contents of both of which are incorporated herein by reference.

FIELD

The present disclosure generally relates to steering columns for motor vehicles.

BACKGROUND

In order to adapt the steering wheel position to the seat position of the driver of a motor vehicle, adjustable steering columns are known in various configurations in the prior art. The steering wheel mounted at the rear end of the steering spindle in steering columns of this kind may be positioned by a length adjustment in the direction of the steering column's longitudinal axis in the longitudinal direction in the vehicle interior.

The lengthwise adjustability is realized in that the adjustment unit, consisting of an outer casing unit, or casing unit for short, and an inner casing tube, or casing tube for short, is mounted rotatably in the steering spindle, is telescopically adjustable in the direction of the longitudinal axis, i.e., in the longitudinal direction, and is securable in different lengthwise positions by means of a releasable clamping device, i.e., it is releasably securable. The clamping device, also known as a securing device, acts on the outer casing unit, which is held on the vehicle body, and in the opened state of the clamping device—also equivalently referred to as the release position or loosening position—a displacement of the inner casing tube in the outer casing unit is possible in order to adjust the steering wheel position and in the closed state—the fixing position or securing position—the inner casing tube is clamped in the outer casing unit and in normal driving operation the steering wheel position is fixed under the mechanical stresses to be expected.

A known effective measure for improving passenger safety during a vehicle collision, or so-called crash event, during which the driver impacts with high speed against the steering wheel, is to design the steering column to be collapsible even in the fixing position of the clamping device in the longitudinal direction when a force is exerted on the steering wheel in excess of a limit value only occurring in a crash event. In order to ensure a controlled braking of a body striking against the steering wheel, an energy absorption device is coupled in between the casing unit and the casing tube, which in normal operation are fixed together by the clamping device, but in a crash event are pushed together. This converts the introduced kinetic energy into plastic deformation of an energy absorption element, for example by tearing off a pull tab or bending an elongated bending element, such as a bending wire or a bending strip.

A steering column of this kind is described in DE 10 2008 034 807 B3. The clamping device described therein comprises a locking element which is supported on the outer casing unit in the longitudinal direction and which can be brought into force-locking and form-fitting engagement transversely to the longitudinal direction with a corresponding engagement part on the inner casing tube in the fixing position. In the release position, the locking element is lifted off from the engagement part and thereby released, so that the inner casing tube is displaceable relative to the casing unit for adjusting the steering wheel position in the longitudinal direction.

The engagement part is connected by an energy absorption device to the inner casing tube, which is not stressed in normal operation and forms a rigid connection between the outer casing unit and the inner casing tube. In a crash event, however, so great a force is introduced via the locking element into the engagement part that the holding force provided by the clamping device is overcome and the outer casing unit and the inner casing tube move relative to each other in the longitudinal direction, thereby deforming the energy absorption element and braking the movement.

Furthermore it is proposed in the mentioned DE 10 2008 034 807 B3 to design a controllable braking action of the energy absorption device so as to make provision in a crash event for whether the driver is wearing a seat belt or not, or to make an adjustment to parameters such as driver weight, distance from the steering wheel, and the like. Specifically for this purpose, at least two energy absorption elements should be provided, which can be activated when needed by being coupled in between the outer casing unit and the inner casing tube by being brought through the coupling device into mechanical operative connection between the engagement part and the inner casing tube. For the coupling to the energy absorption element, the engagement part comprises at least one first driver element, which can be brought into operative engagement with the first energy absorption element. Due to the design of the coupling device, at least one of the energy absorption elements can be coupled in between the inner casing tube and the engagement part, or at least one of the energy absorption elements can be coupled out. In this way, a switchable braking characteristic, or crash level, can be realized individually for the particular operating instance.

Another configuration of a switchable energy absorption device for a steering column is described in US 2015/0375773 A1. This likewise comprises two energy absorption elements, one of which can be coupled out in order to reduce the crash level by the coupling device from the flow of force between casing unit and inner casing tube. In this configuration, the driver element of the coupling device and the locking element directly engage with the energy absorption element, which may have a detrimental effect on the function.

The drawback to the energy absorption device already known from DE 10 2008 034 807 B3 is that a relatively large installation space is needed due to the arrangement of the energy absorption elements. The reliably switchable design of the coupling device is relatively costly.

Thus a need exists for a steering column with an improved switchable energy absorption device that ensures a high degree of functional reliability in a flexibly adaptable installation space.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to steering columns for motor vehicles. In some examples, a steering column may comprise an inner casing tube in which a steering spindle is mounted so as to be rotatable about its longitudinal axis; an outer casing unit in which the inner casing tube is held and which is directly or indirectly connectable to the body of a motor vehicle; and a clamping device, which in the fixing position secures the outer casing unit relative to the inner casing tube and in a release position permits an adjustment of the inner casing tube relative to the outer casing unit at least in the longitudinal direction. The clamping device may comprise at least one locking element, which is supported in the longitudinal direction on the outer casing unit and which in the fixing position is non-displaceably connected in the longitudinal direction to an engagement part connected to the inner casing tube, and which in the release position is released from the engagement part and permits a relative movement of the inner casing tube relative to the outer casing unit in the longitudinal direction. The inner casing tube and the outer casing unit may be coupled by way of an energy absorption device that comprises at least two energy absorption elements and a coupling device. At least one of the energy absorption elements can be coupled in or out between the inner casing tube and the outer casing unit via the coupling device. The energy absorption element in the coupled-in state and in the fixing position of the clamping device may be plastically deformable in the event of a relative displacement in the longitudinal direction of the inner casing tube and the outer casing unit.

It is proposed according to the invention that the engagement part comprises at least one connecting part which comprises a second driver element, which can be brought into operative engagement with the second energy absorption element, wherein the engagement part and the connecting part are connected to each other in the longitudinal direction via the coupling device in a releasable manner.

The engagement part is formed separately from the energy absorption elements. In a crash event, the force transmission from the casing unit to the energy absorption device is ensured on the one hand via the connection to the locking element and on the other hand via the connection to the energy absorption elements. According to the invention, it is characterized in that it can be designed so as to be separable transversely to the longitudinal direction, so that it can be separated into at least two partial elements, which can be decoupled in the longitudinal direction and can move independently of one another. This is realized in that the at least one connecting part can be released from the engagement part, i.e., be decoupled in the longitudinal direction, by decoupling of the coupling device.

The engagement part is connected immovably to the locking element with respect to the longitudinal direction in the fixing position, for example, by corresponding interlocking form-fitting elements, such as a toothing or the like. The connecting part forms a partial element, which is connected optionally by the coupled coupling device to the engagement part, so that the connected or coupled state is realized, or it is released from the engagement part in the separated or decoupled state by the now decoupled coupling device. In the coupled state, the at least one connecting part in a crash event is moved together with the latter in the longitudinal direction relative to the inner casing tube. In the separated, decoupled state, the connecting part has no mechanical connection to the engagement part via the coupling device, so that in a crash event only the engagement part is moved relative to the inner casing tube, but the connecting part remains at rest relative to the inner casing tube.

Due to the fact that the engagement part is operatively connected via a first driver element to a first energy absorption element, and the connecting part comprises a second driver element which is in operative connection with a second energy absorption element, the first and the second energy absorption element is deformed in a crash event in the connected state, in which the connecting part is connected by the coupling device to the engagement part, and in a crash event it is moved together with this relative to the inner casing tube. This realizes a high crash level with high energy absorption. In the separated state, only the engagement part is moved relative to the inner casing tube in a crash event, so that only the first energy absorption element connected to the engagement part is deformed and a lower crash level with less energy absorption is realized. In the separated state, the second energy absorption element connected to the released connecting part, separated from the engagement part, remains undeformed; it is deactivated and absorbs no energy.

The activating of the coupling device in the invention enables a controlled separation of the engagement part when needed, wherein at least one connecting part is released from the engagement part, and thereby the crash level can be changed, as described above.

The rearrangement of the energy absorption device according to the invention has the benefit that the coupling device does not interact directly with one of the energy absorption elements, as in the prior art, but instead the engagement part via the first driver element and the connecting part via the second driver element can remain connected to the respective energy absorption elements independently of the state of the coupling device. The separating of the connecting part from the engaging element does not affect the connection of the driver elements to the energy absorption elements. In this way, the function of the connection between the energy absorption elements and the engagement part is independent of the function of the decoupling or coupling out of individual energy absorption elements. Due to the fact that in the invention the functionality of the mechanical separation out from the flow of force is realized in a crash event independently of the connection of the energy absorption elements to the engagement part, the energy absorption elements can be optimized with greater design freedom in regard to the energy absorption behavior.

The releasable connection between the engagement part and the connecting part according to the invention can be designed in an advantageous manner independently of the connection between the engagement part and the energy absorption elements and be adapted to the required functionality. The strains to be expected between the engagement part and the connecting part can be absorbed by design features in order to ensure that a reliable separation occurs upon activation of the coupling device in a crash event. An optimization can be made in terms of the coupling and decoupling of the engaging and connecting part, without having to make compromises which might result from the deformation behavior of the energy absorption elements.

Due to the connection of the energy absorption elements to the engagement part and the connecting part in the invention being independent of the switching functionality of the energy absorption device, which according to the invention is shifted in the separation of the engaging element, there is greater design freedom in terms of the configuration and spatial arrangement of the energy absorption elements. Hence, there can be better adaptation to the available installation space, for example by realization of smaller dimensions or predetermined shapes.

The engagement part according to the invention has an engagement section designed for the releasable connection to the locking element, and comprises for example form-fitting elements, which may be designed as teeth or the like. A connecting part according to the invention is connected to the engagement part outside of the engagement section. It is possible to provide one connecting part or also several connecting parts which can be separated from the engagement part to realize different crash levels by one or more coupling devices. The connecting parts may respectively comprise driver elements, which in turn can be connected to third or possibly further energy absorption elements. By separating one or more connecting parts through corresponding activating of the coupling devices, in each case energy absorption elements connected to the connecting parts can be optionally coupled out from the flow of force between the outer casing unit and the inner casing tube, so that different crash levels can be realized.

One embodiment of the invention proposes that the coupling device comprises an actuator, which interacts with a movable coupling element, which is arranged between the connecting part and the engagement part and upon activation of the actuator is movable for the releasing of the connecting part from the engagement part. The coupling element serves for the releasable fastening of the connecting part to the engagement part and is mounted on the actuator. Upon triggering in a crash event, the actuator acts on the coupling element and moves it into a release position, in which the connecting part is released from the engagement part, i.e., mechanically separated. This results in the switching to the decoupled state. The coupling element can be optimized so that a secure connection between the connecting part and the engagement part is produced on the one hand in the coupled, connected state in a crash event, and on the other hand it can likewise be brought reliably by the actuator into the decoupled, released state when needed.

The engagement part and/or the connecting part may have form-fitting elements with which the coupling element interacts. In the connected state, the coupling element may engage by form fit with the form-fitting elements and thereby couple or lock together the connecting part and the engagement part by form fit, so that in a crash event the force is transmitted by the form fit in the longitudinal direction and the connecting part is moved together with the engagement part relative to the inner casing tube. By activating of the actuator, the coupling element can be moved out from the form-fitting elements, so that the form fitting connection is released and the connecting part is thereby separated from the engagement part.

The decoupling can be assisted in that the coupling element and/or at least one of the form-fitting elements has a friction-reducing configuration. At least one of the oppositely situated surfaces of a coupling or form fitting element that slide against each other upon activation of the actuator may be provided entirely or partially with a friction-reducing coating, or with sliding elements which reduce the friction by their material or shape.

In one embodiment of the invention, the form-fitting elements may have at least one form-fitting opening running transversely to the longitudinal direction, in which the coupling element can be received. The form-fitting opening may for example extend in the circumferential direction tangentially with a radial spacing to the longitudinal axis through the engagement part and the connecting part. A substantially pin-shaped coupling element may be received therein to produce a form-fitting connection. For the separation of the connection, the coupling element may simply be pulled out from the form-fitting opening by activating the actuator. Due to the pin-shaped coupling element inserted into the form-fitting opening, an easily constructed and effective form-fitting interlocking of the connecting part with the engagement part is accomplished. The removal of the coupling element for the separating of the connecting part can be achieved reliably and with little expense. This ensures a functionally reliable design, which is flexible and can be realized in a relatively small installation space.

In one advantageous modification it may be provided that the engagement part and/or the connecting part is designed as an extruded component or a sintered component. In this way, the engagement part and/or the connecting part can be produced in a simple and economical way.

It is furthermore advantageous for the actuator to be designed as a pyroelectrical actuator. The pyroelectrical actuator can be actuated for the pyrotechnical driving of the coupling element. A pyroelectrical actuator, often also called a "pyro-switch", comprises a pyrotechnical propellant charge, which is ignited by an electrical trigger pulse. The explosion of the propellant charge accelerates a movable actuator, which in the present application is connected to a coupling element. In this way, the coupling element can be moved for the separation of the connecting part from the engagement part according to the invention, or to produce a mechanical coupling or decoupling of the engagement part and a connecting part in some other way. Advantages of such a pyroelectrical coupling device are the extremely fast triggering in a crash event and the high reliability and activating force, which ensures a reliable coupling in or coupling of one or more connecting parts when needed. For example, the coupling element may be designed so as to be pin-shaped, and it may be shot out pyrotechnically from the form-fitting elements for the decoupling of the connecting part from the engagement part.

One modification of the invention proposes that the engagement part and the connecting part have positioning elements which can be brought into engagement with each other. The positioning elements for example may comprise form-fitting elements which can be brought into engagement with each other in the longitudinal direction, such as shoulders, or tongue and groove elements, which in the connected state bring about a positionally exact relative fixation of the engagement part and the connecting part transversely to the longitudinal direction. This ensures that the engagement part and the connecting part in the coupled, connected state are moved together reliably in a crash event.

Preferably, the engagement part is connected by a predetermined breaking element to the inner casing tube. The predetermined breaking element may be designed for example as a breakaway rivet, a shear bolt, or the like, which breaks upon exceeding a defined limit force, the so-called breakaway force, which only occurs in a crash event in the longitudinal direction between the outer casing unit and the casing tube, and thereby enables the relative movement of the engagement part relative to the energy absorption elements supported on the casing tube. This ensures that only upon exceeding the limit force, i.e., actually only in a crash event, will force be channeled into the energy absorption elements. This guarantees the functional reliability of the energy absorption device.

One advantageous embodiment proposes that at least one energy absorption element is designed as a U-shaped bending element, which comprises two legs joined together by a bend, wherein one leg can be secured on the engagement part or on the connecting part and the other leg can be supported on the inner casing tube in the longitudinal direction. It is known how to design an energy absorption element as a bending wire or bending strip, which is formed in U-shape by a bending of preferably 180°, where the two mutually opposite legs of the U extend substantially parallel to the longitudinal direction, meaning by "substantially parallel" a deviation by a solid angle of ±10°. The end of the one leg is connected to the inner casing tube relative to a movement in the longitudinal direction, for example being supported in a crash event in the longitudinal direction against an end stop or abutment on the casing tube. The other end is connected to the engagement part or the connecting part over a driver element for the channeling of the force, by which said end is driven in the longitudinal direction in a crash event. Under a relative lengthwise displacement of the two ends in a crash event, the bend moves in the longitudinal direction over the longitudinal extension of the bending element, and kinetic energy is converted or absorbed through work of deformation.

In the invention, two or more identical or substantially identically formed energy absorption elements may be used, such as identical U-shaped bending elements. The bending elements may also be substantially identical, i.e., at least similar in configuration, for example as bending elements having the same external dimensions with different energy absorption capacity. This enables an interchangeability, so that by combination of different bending elements it is possible to create adapted, switchable energy absorption characteristics with little expense.

The two U-shaped bending elements can be arranged with their bend preferably in the direction of the front of the vehicle. It is however also conceivable and possible to arrange one or both U-shaped bending elements so that the bends are oriented in a different direction or directed opposite the front of the vehicle. If the legs have different directions, they are thus directed against each other or away from each other, and in a crash event the one bending element is pressed together and the other one is pulled apart. If the two bending elements are oriented the same with their legs—to the front or to the rear—both bending elements in a crash event can be deformed by relative compression or tension on the legs, depending on the installation position.

The engagement part and the connecting part may comprise respectively a bolt-shaped driver element, which engages with one leg of the bending element. The bending element may have a segment bent transversely to the longitudinal direction, with which the driver element engages by form fitting and in a crash event ensures a reliable driving in the longitudinal direction. One advantageous difference of the invention from the switchable energy absorption devices known in the prior art is that the driver elements are in engagement with the bending elements regardless of the coupled or decoupled state, and are not moved upon activation of the coupling device.

Preferably the bending elements are arranged such that at least two bending elements are oriented with their legs equally in the longitudinal direction. The U-legs, as seen from the bend, point in the same longitudinal direction parallel to the longitudinal axis. In this way, the bending elements are deformed in the same way in a crash event, which is advantageous in terms of reproducible energy absorption properties.

At least two energy absorption elements may be arranged in succession in the longitudinal direction. Preferably, the bending elements are designed so as to be separate and are arranged at a spacing from one another in the longitudinal direction. In this way, a flat design can be realized, demanding little installation space in the radial direction. The bending elements being separate means that the at least two bending elements are not directly connected to each other, but rather they are each connected by the one leg to the casing tube and by the other leg to the engagement part or the connecting part. Furthermore, the bending elements being spaced apart from one another in the longitudinal direction ensures that in a crash event no mutual interference can occur in the energy-absorbing deformation. Preferably, a positive spacing exists in the longitudinal direction between the bend of the one bending element and the ends of the legs of the other bending element.

It is advantageous for the energy absorption elements to be arranged in a common housing. The housing forms part of the energy absorption device according to the invention, which at least partly encloses the energy absorption elements and protects against disturbing influences. Moreover, fastening elements for the energy absorption elements, longitudinal guideways for the engagement part, and so forth may be formed in or on the housing. In this way, the energy absorption elements are housed in a protected manner. Furthermore, a compact design can be realized in a small installation space. The coupling device may be mounted on the housing, for example in the form of a pyroelectrical actuator.

A separating element can be arranged between the energy absorption elements. For example, a separating element can be formed by a partition wall or a separating plate installed between adjacent energy absorption elements. In this way, adjacent energy absorption elements are functionally shielded from each other, so that the function of one energy absorption element cannot be influenced by adjacent energy absorption elements. This brings the benefit of an enhanced operational and functional reliability in a crash event.

In order to ensure that the deformation of the energy absorption element or elements in a crash event is uniform and undisturbed, at least one energy absorption element, such as one bending element and/or the housing, can be provided with a slide coating. The slide coating works to reduce friction and ensures that the deformation of the bending wire or bending strip in a crash event occurs smoothly and is not hindered by friction or seizing if parts of the bending elements come into contact with each other or with surrounding components, such as the housing. This heightens the functional reliability.

The energy absorption elements can be arranged in a radially open C-shaped inner profile mounted on the inner casing tube. This simplifies the fabrication, since the energy absorption elements, such as bending elements, are easily inserted from the outside into the open inner profile. The inner profile may preferably be connected by material bonding to the casing tube, for example by welding. Alternatively or additionally, form fitting connections with fastening elements can be provided for the fastening. End stops or abutments can be formed in the inner profile, against which the bending elements are supported by one leg in a crash event against the casing tube in the longitudinal direction.

On the inner casing tube a housing can be mounted, designed as a holding profile, with a slot elongated in the longitudinal direction, through which the driver elements of the engagement part and the connecting part extend. The housing fashioned as a holding profile serves as a cover for the inner profile and holds the engagement part. The driver elements led through the slot ensure a forced guidance in the longitudinal direction upon lengthwise movement of the engagement part and possibly of the connecting part relative to the housing in a crash event. This enhances the functional reliability.

One embodiment of the invention calls for holding the outer casing unit in a bracket, which can be fixed to the vehicle. In this way, an especially rigid attachment of the steering column to the vehicle can be realized.

The casing unit is preferably held at a front end of the bracket and able to swivel about a swivel axis and is received between two side cheeks of the bracket, wherein the casing unit can be secured relative to the bracket by means of the clamping device.

By providing the swivel axis between the casing unit and the bracket, the tilt adjustment of the casing unit relative to the bracket can be realized. Thus, the tilt adjustment, also known as vertical adjustment, of the casing unit can be further simplified, as opposed to attaching the casing unit directly to the vehicle by means of an axle that needs to be inserted through a receiving bore of the casing unit and a corresponding receiving section of the vehicle's cross beam, in order to provide the swivel axis.

Figure 1:
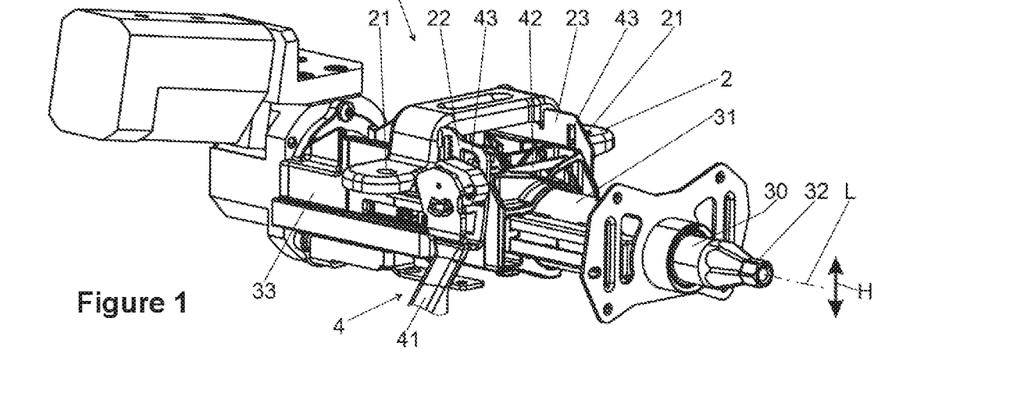
FIG. 1 is a perspective view of an example steering column.
Figure 2:
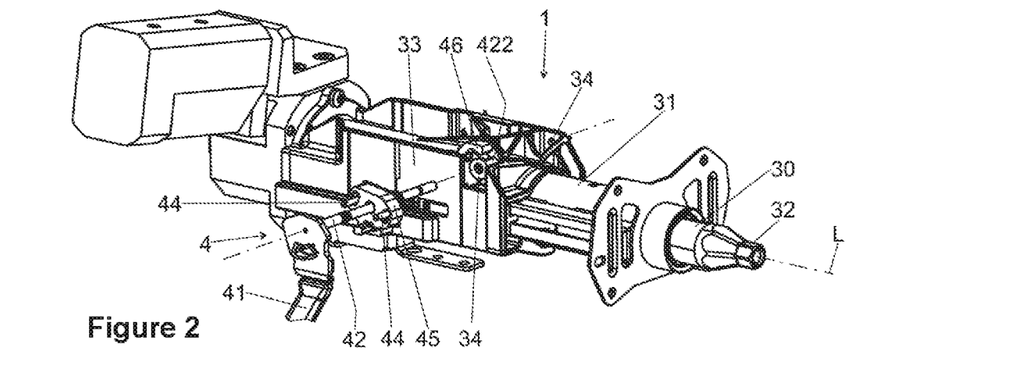
FIG. 2 is a perspective view of the steering column of FIG. 1 in a partly disassembled state.
Figure 3:
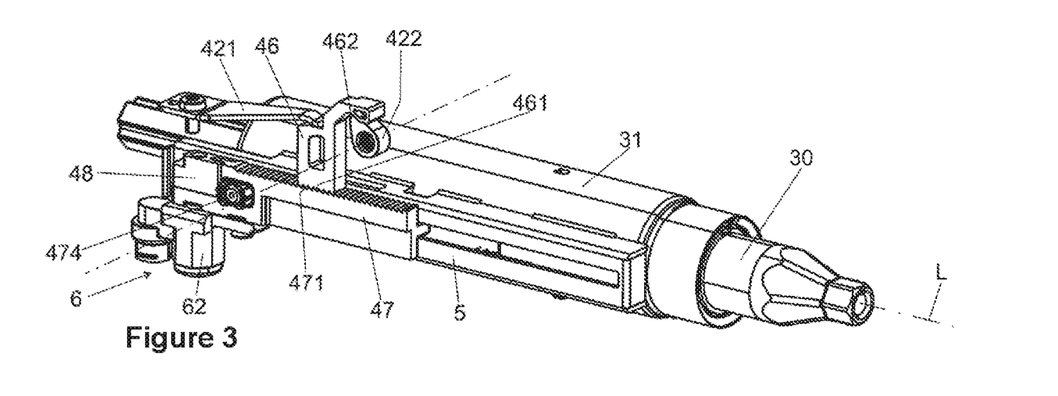
FIG. 3 is a detailed view of an example inner casing tube with an example clamping device and an example energy absorption device of the steering column of FIG. 1.

In FIGS. 1 and 2 a steering column 1 according to the invention is shown schematically in perspective view, slanting from behind (relative to the driving direction of a motor vehicle, not shown).

The steering column 1 may be fastened to the bodywork of a motor vehicle, not shown, by means of a bracket 2, which for the sake of clarity is left out from the view of FIG. 2. The bracket 2 has fastening means 21 for the connection to the bodywork, from which side cheeks 22, 23 extend.

A steering spindle 30 is mounted rotatably about the longitudinal axis L in an inner casing tube 31, or casing tube 31 for short, wherein a steering wheel, not shown, can be mounted on the rear end 32 of the steering spindle 30. The inner casing tube 31 is held in a receptacle extending in the longitudinal direction of an outer casing unit 33, or casing unit 33 for short.

A clamping device 4 may be brought by manual activation of a clamping lever 41 optionally into a fixing position (closed state) or a release position (opened state). In the release position, the inner casing tube 31 is telescopically movable within the outer casing unit 33 for a length adjustment in the direction of the longitudinal axis L, and the outer casing unit 33 can be adjusted up and down in the vertical direction H relative to the bracket 2 in the arrow directions. In the fixing position, both the inner casing tube 31 is fixed in the longitudinal direction and the outer casing unit 33 in the vertical direction H. The fixing position corresponds to the normal operation of the steering column 1, in which it is ensured that the adjusted steering wheel position will not change under the forces normally acting on the steering spindle 30 via the steering wheel.

Specifically, the clamping device 4 comprises a clamping bolt 42 connected to the clamping lever 41 in a rotationally fixed manner, which is passed through oblong holes 43 in the mutually opposite side cheeks 22, 23 transversely to the longitudinal axis L. By a clamping mechanism known per se, which may comprise a tilting pin arrangement 44 supported in a rotationally fixed manner on the clamping bolt 42 and an oppositely situated support disk 45, mounted in a rotationally fixed manner on the side cheek 22, as shown in the embodiment represented, the support disk 45 is moved axially relative to the clamping bolt 42 upon rotation and thus pressed from the outside against the side cheek 22. As the clamping bolt 42 is mounted in an axially immovable manner on the opposite side cheek 23, the two side cheeks 22 and 23 will move relative to each other, and the outer casing unit 33 arranged in between them is clamped with force locking. In place of the illustrated tilting pin arrangement 44, 45, other mechanisms may also be used to convert a rotation into a clamping movement, for example with cam disks or roller elements. Alternatively, it is conceivable and possible to design the clamping device as an electromechanical clamping device, in which the moving from the release position to the fixing position and vice versa occurs by means of an electric motor.

The clamping bolt 42 is passed through openings 34 in the casing unit 33 situated opposite each other transversely to the longitudinal axis L, which like a clamping sleeve is slotted in the longitudinal direction between the openings 34. In this way, when the side cheeks 22, 23 of the bracket 2 are clamped as described by the clamping force, the outer casing unit 33 is compressed transversely to the longitudinal axis L, so that the fixing position is adjusted, wherein the inner casing tube 31 is secured with force locking in the casing unit 33. The casing unit 33 has a slot in the direction of the longitudinal axis L, which is formed in the area of the clamping bolt 42, wherein the slot in the fixing position has a reduced width as a result of the acting clamping force in comparison to the release position. As a result of this reduced width, an inner diameter of the casing unit 33 is reduced, so that the inner casing tube 31 is secured in the casing unit 33.

The clamping device 4 comprises a locking element 46 and an engagement part 47. The locking element 46 is mounted in the casing unit 33 immovably in the longitudinal direction, i.e., in the direction of the longitudinal axis L. In the vertical direction H, the locking element 46 is mounted so as to be able to move up and down to adjust the fixing and release position. The engagement part 47 is connected via an energy absorption device 5 to the casing tube 31. On their mutually facing sides transversely to the longitudinal axis L, the locking element 46 and the engagement part 47 have corresponding toothings 461 and 471 which can be brought into form fitting engagement with each other, having teeth running transversely to the longitudinal axis L.

Figure 5:
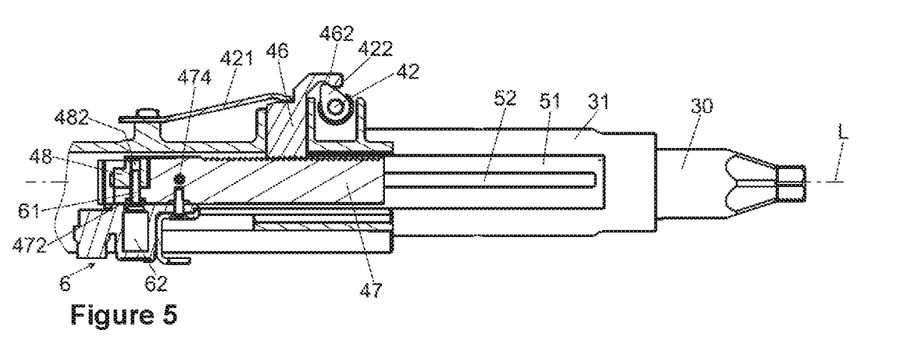
FIG. 5 is a longitudinal sectional view through the clamping device of the steering column of FIGS. 1 to 4 in a fixing position of the clamping device.

In the fixing position of the clamping device 4, the locking element 46 is pressed by a spring 421 supported on the casing unit 33 against the engagement part 47, thereby holding the toothings 461 and 471 in form fitting engagement. Due to the interlocking teeth running transversely to the longitudinal axis L, the locking element 46 and the engagement part 47 in the fixing position are joined together with form fitting immovably in the longitudinal direction. This is clearly evident in FIG. 5.

Figure 6:
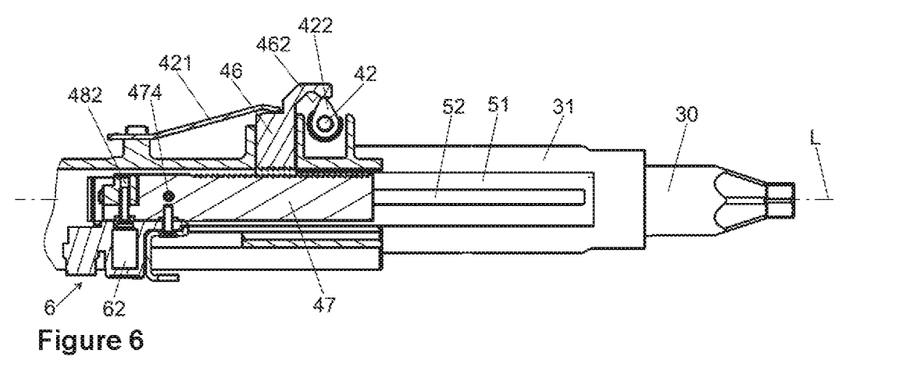
FIG. 6 is a longitudinal sectional view through the clamping device of the steering column of FIGS. 1 to 4 in a release position of the clamping device.

On the clamping bolt 42 an eccentric cam 422 is mounted, which interacts with a cam track 462 of the locking element 46. If the clamping bolt 42 is moved from the fixing position represented in FIG. 5 by turning the clamping lever 41 clockwise to the release position shown in FIG. 6, the cam 422 will be moved against the cam track 462 and lift the locking element 46 against the spring force of the spring 421—upward in the figures—so that the toothings 461 and 471 are lifted up from each other and thus brought out of engagement. In this release position—as described above—the clamping of the casing tube 31 in the casing unit 33 is released, so that the casing tube 31 can be moved slightly forward or back in the longitudinal direction parallel to the longitudinal axis L in the casing unit 33.

According to the invention, the engagement part 47 comprises a connecting part 48. The connecting part 48 forms a separate piece, which is connected via a coupling device 6 to the engagement part 47. The triggering of the coupling device 6 makes it possible to release the mechanical connection between the engagement part 47 and the connecting part 48, so that these are separated from each other and can move independently of each other in the longitudinal direction, as will be explained below.

The coupling device 6 comprises a pin-shaped coupling element 61, which is mounted on a pyroelectrical actuator 62. Upon triggering or activating of the actuator 62, a pyrotechnical charge is ignited, by which the coupling element 61 is moved in its axial direction toward the actuator 62, downward in the figures.

The actuator 62 is fastened to the engagement part 47, wherein the coupling element 61 passes through a form-fitting opening 472 running transversely to the longitudinal axis L and a coaxial form-fitting opening 482 formed in the connecting part 48. As a result the coupled state, also known as the connected state, is realized, in which the engagement part 47 is connected to the connecting part 48 in the longitudinal direction by the coupling device 6. In this way, when force is channeled across the locking element 46 in a crash event, the engagement part 47 and the connecting part 48 move jointly in the longitudinal direction.

The coupled state is shown in FIGS. 5, 6, 7, 8, 9 and 10.

If the coupling device 6 is ignited, the actuator 62 moves the coupling element 61 out from the form-fitting opening 482, so that the decoupled state is adopted, also known as the separated state, in which the engagement part 47 and the connecting part 48 are mechanically separated from each other. In the decoupled state, when a force is channeled through the locking element 46 in a crash event, only the engagement part 47 is driven relative to the inner casing tube 31 in the longitudinal direction. The connecting part 48 remains at rest with respect to the casing tube 31.

Figure 11:
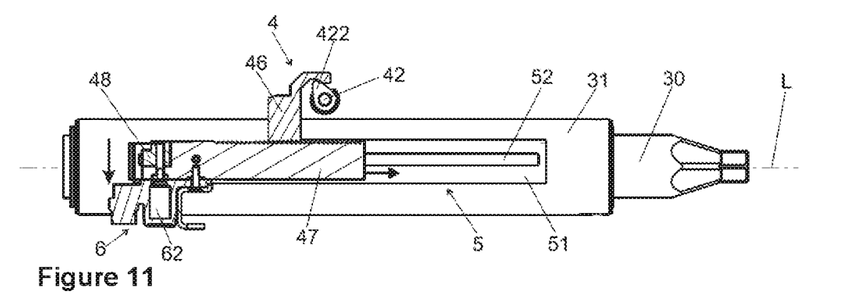
FIG. 11 is a longitudinal sectional view of the energy absorption device of the steering column of FIG. 7 with a low crash level before a crash.
Figure 12:
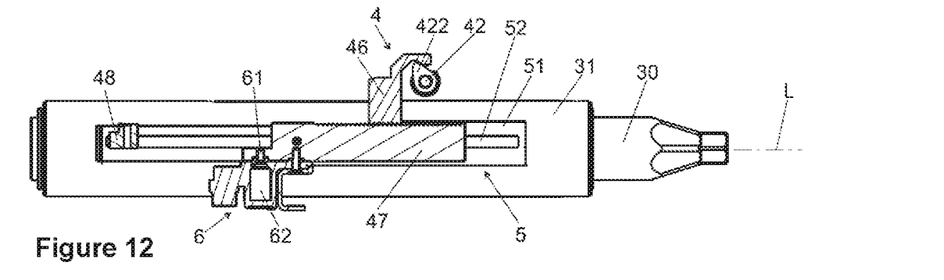
FIG. 12 is a longitudinal sectional view of the energy absorption device of FIG. 7 with the low crash level after a crash.
Figure 13:
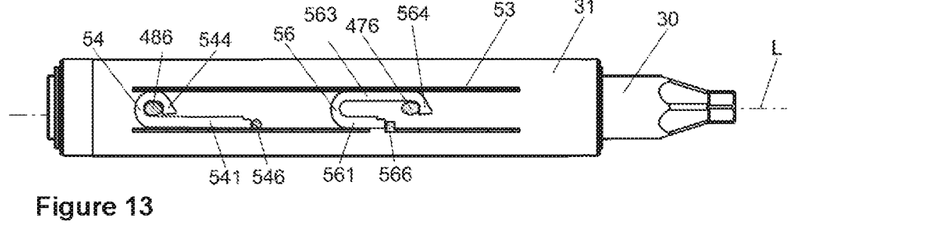
FIG. 13 is a side view of example energy absorption elements in the state of FIG. 12.

The decoupled state is shown in FIGS. 11, 12 and 13.

The connecting part 48 comprises a positioning element 485 in the form of a groove open in the longitudinal direction, in which a corresponding positioning element 475 formed on the engagement part 47 as a matching protrusion in the manner of a tongue and groove connection can be inserted in the longitudinal direction. In this way, the engagement part 47 and the connecting part 48 are positioned with form fitting relative to each other transversely to the longitudinal direction.

The engagement part 47 has a fastening opening 473, through which a predetermined breaking element in the form of a shear bolt 474 is led, being firmly connected to the casing tube 31 and holding the engagement part 47.

The energy absorption device 5 is mounted on one side on the inner casing tube 31, namely on the side facing the observer in all the figures. The energy absorption device 5 has a housing (holding profile) 51 in the form of a C-shaped rail with substantially rectangular cross section, which is firmly connected to the inner casing tube 31 and extends in the longitudinal direction, the open cross section being oriented toward the outside of the inner casing tube 31. By means of form-fitting elements 510, which engage with corresponding receiving openings 310 in the inner casing tube 31, the holding profile 51 is firmly connected to the casing tube 31, for example by means of laser welding. In this way, the housing 51 formed as a holding profile together with the inner casing tube 31 forms an elongated housing of the energy absorption device 5 with substantially rectangular internal cross section, extending on one side of the casing tube 31 parallel to the longitudinal axis L. On its radially outward oriented outer side, the housing 51 formed as a holding profile has a slot 52 extending parallel to the longitudinal axis L.

In the holding profile 51 a likewise C-shaped inner profile 53 is arranged, extending in the longitudinal direction and outward, i.e., being open toward the holding profile 51. The inner profile 53 may be joined firmly to the casing tube 31, for example by welding, and it may be formed of spring steel plate. In the inner profile 53 a first energy absorption element 54 and a second energy absorption element 56 are arranged with a spacing in the longitudinal direction—looking in the longitudinal direction.

Figure 14:
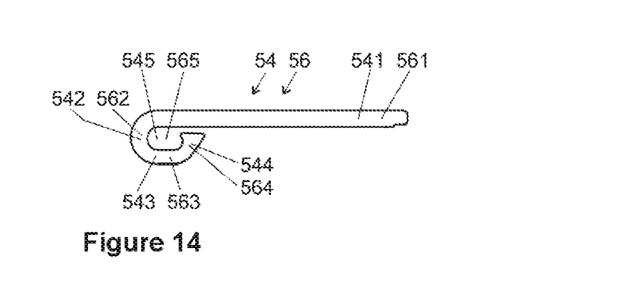
FIG. 14 is a side view of an example energy absorption element.

FIG. 14 shows energy absorption elements 54 and 56 of identical shape and with identical basic function. These are each configured as U-shaped bending wires or bending strips, with a first leg 541 or 561, connected by a bend 542 or 562 of 180° to a second leg 543 or 563. At the end of the second leg 543 or 563 a driver hook 544 or 564 is formed by a bend toward the first leg 541 or 561. Thus, each time an engagement opening 545 or 565 of an energy absorption element 54 or 56 is formed by the legs 541, 543, the bend 542 and the driver hook 544, or by the legs 561, 563, the bend 562 and the driver hook 564. The energy absorption elements 54 and 56 may be fashioned as stamped parts, so that an economical fabrication is ensured.

By their first leg 541 or 561, the energy absorption elements 54 and 56 are braced contrary to the longitudinal direction (arrow in FIG. 7, 9, 11, 13) against abutments 546 or 566 projecting inward into the cross section of the inner profile 53, forming an end stop in the longitudinal direction.

Figure 4:
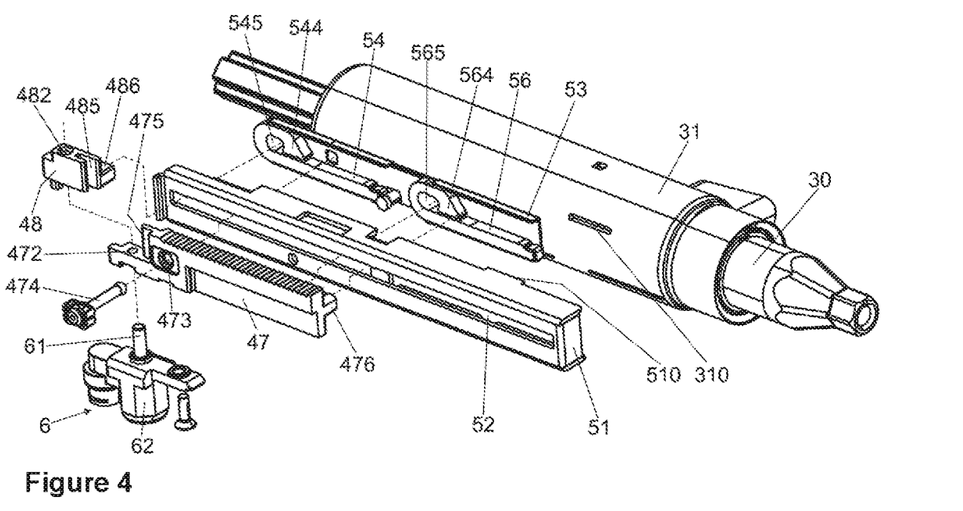
FIG. 4 is a partly exploded view of the casing tube with the clamping device and the energy absorption device of FIG. 1.

The engaging element 47 comprises a driver element 476, and the connecting element 48 comprises a driver element 486, as can be seen in FIG. 4.

The engagement part 47 and the connecting element 48 are arranged on the holding profile 51 such that the driver elements 476 and 486 engage through the slot 52 with the engagement openings 545 and 565 of the energy absorption elements 54 and 56. In this way, the engagement part 47 can engage with the driver element 476 behind the driver hook 564 of the energy absorption element 56, led in the longitudinal direction parallel to the longitudinal axis L in the slot 52 of the housing 51, fashioned as a holding profile, and bend it, i.e., plastically deform it, in a crash event. Correspondingly, the connecting part 48 can engage with the driver element 486 behind the driver hook 544 of the energy absorption element 54, led in the longitudinal direction parallel to the longitudinal axis L in the slot 52 of the holding profile 51, and bend it, i.e., plastically deform it, in a crash event.

FIGS. 7, 8, 11 and 12 each show a side view of the casing tube 31 with the energy absorption device 5 and the clamping device 4 arranged on it in various operating states. The clamping device 4 is located in the fixing position, in which the locking element 46 is braced on the outer casing unit 33, not shown here, in the longitudinal direction and secures the engagement part 47 with respect to the casing unit 33 by its toothing 461.

Figure 7:
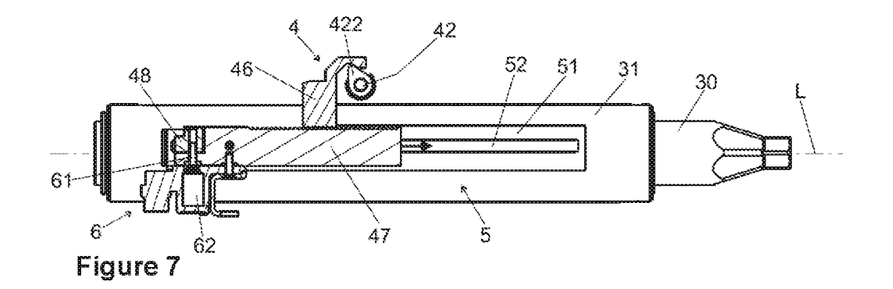
FIG. 7 is a longitudinal sectional view of the energy absorption device of the steering column of FIGS. 1 to 6 with a high crash level before a crash.

In FIG. 7 the coupling device 6 is in the state of rest, in which the pin-shaped coupling element 61 is received in the coaxial form-fitting openings 472 and 482. In this way, the engagement part 47 and the connecting element 48 are coupled together by the coupling device 6 in the longitudinal direction, i.e., mechanically interconnected in the longitudinal direction. This adjustment forms the coupled state, also known as the connected state.

Figure 9:
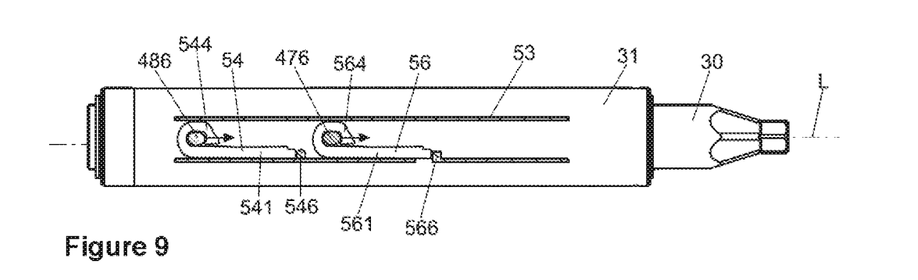
FIG. 9 is a side view of the energy absorption elements in the state of FIG. 7.

The driver element 486 of the connecting part 48 and the driver element 476 of the engagement part 47 are led through the slot 52 and engage with the engagement openings 545 and 565 behind the driver hook 544 and 564 of the energy absorption element 54 and 56, as shown in FIG. 9, where the holding profile 52 has been left out.

FIG. 7 shows the normal operating state. In a crash event, a body impacting against the steering wheel, not shown, exerts a large force in the longitudinal direction on the steering spindle 30. In this way, the holding force acting with force locking between the casing tube 31 and the casing unit 33 by the clamping device 4 is overcome, and the shear bolt 474 is broken by the resulting relative movement between the engagement part 47 and the casing tube 31. The engagement part 47 moves together with the connecting part 48 coupled to it in the longitudinal direction, indicated by the arrow in FIG. 7, relative to the casing tube 31 and the energy absorption device 5 fastened to it, into the lengthwise position shown in FIG. 8. The driver elements 476 and 486 are thus led in the longitudinal direction into the slot 52.

Figure 10:
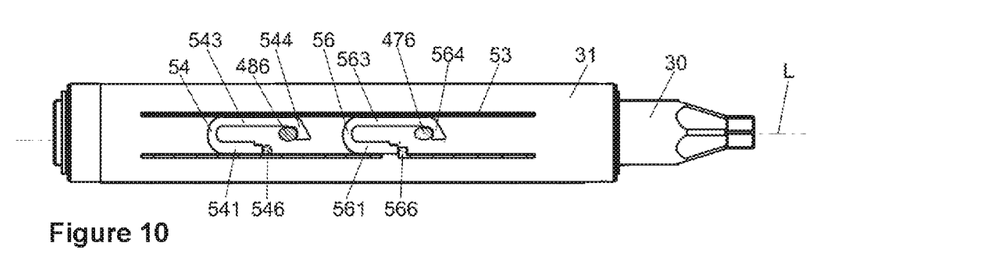
FIG. 10 is a side view of the energy absorption elements in the state of FIG. 8.

In a crash event, the two energy absorption elements 54 and 56 are driven by the driver elements 476 and 486—which move relative to the abutments 546 and 566 in the longitudinal direction indicated by the arrows in FIG. 9—and are deformed while absorbing energy, until the end state shown in FIG. 10 is reached.

In the coupled state of engagement part 47 and connecting element 48 represented in FIGS. 7, 8, 9 and 10, these are moved together in a crash event and both energy absorption elements 54 and 56 are jointly deformed, thereby realizing a high crash level with high energy absorption.

In the preferred exemplary embodiment shown, the two U-shaped bending elements 54 and 56 are arranged with their bend 542 or 562 in the direction of the front of the vehicle. However it is also conceivable and possible to arrange one or both of the U-shaped bending elements 54 and 56 so that the bends 542 and 562 are oriented in different directions or both of them are oriented in the direction opposite the front of the vehicle.

In the exemplary embodiment, both of the supported first legs 541 and 561 are arranged on the bottom side, as can be seen for example from FIG. 9. Moreover, it is also conceivable and possible to arrange one or both of the supported first legs 541 and 561 on the top side.

FIG. 11 and FIG. 12 show the decoupled or separated state. Due to the fact that the actuator 61 has been activated, the coupling element 61 was pulled out in its axial direction from the form-fitting opening 482 of the connecting part 48, as is shown in FIG. 11 by the arrow in the vertical direction, so that the mechanical connection is separated in the longitudinal direction.

In a crash event, as described above, a relative force acts in the longitudinal direction on the engaging element 47, so that this moves relative to the holding profile 51 in the longitudinal direction as indicated by the arrow in FIG. 11.

Figure 8:
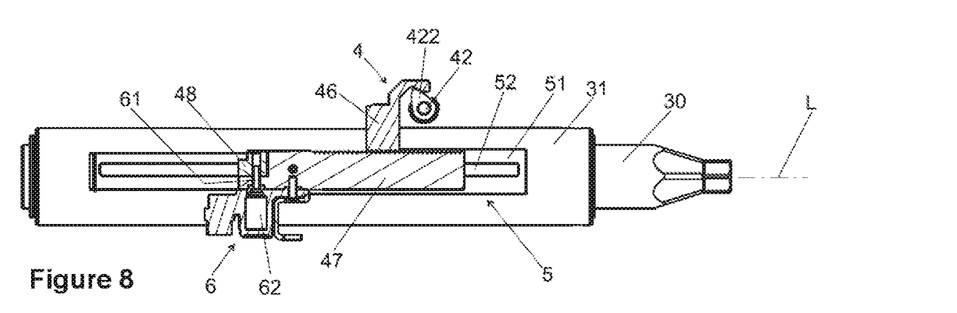
FIG. 8 is a longitudinal sectional view of the energy absorption device of FIG. 7 with the high crash level after a crash.

By contrast with the coupled state shown in FIGS. 7 and 8, in the released state the engagement part 47 still moves, but the separated, decoupled connecting element 48 remains at rest, independently thereof, with respect to the casing tube 31 and the energy absorption device 5, as is clearly evident in FIG. 12. Due to the connecting part 48 being separated from the engagement part 47 in a crash event, also only the one energy absorption element 56 connected to the engagement part 47 is deformed for the energy absorption, as can be seen in FIG. 13, showing the situation after a crash event analogous to FIG. 10. The energy absorption element 54 connected to the decoupled connecting part 48 remains undeformed, i.e., it has not absorbed any energy. Hence, a lower crash level with less energy absorption was realized by activating the coupling device 6 and the separating of engagement part 47 and connecting part 48 effected in this way.

Figure 15:
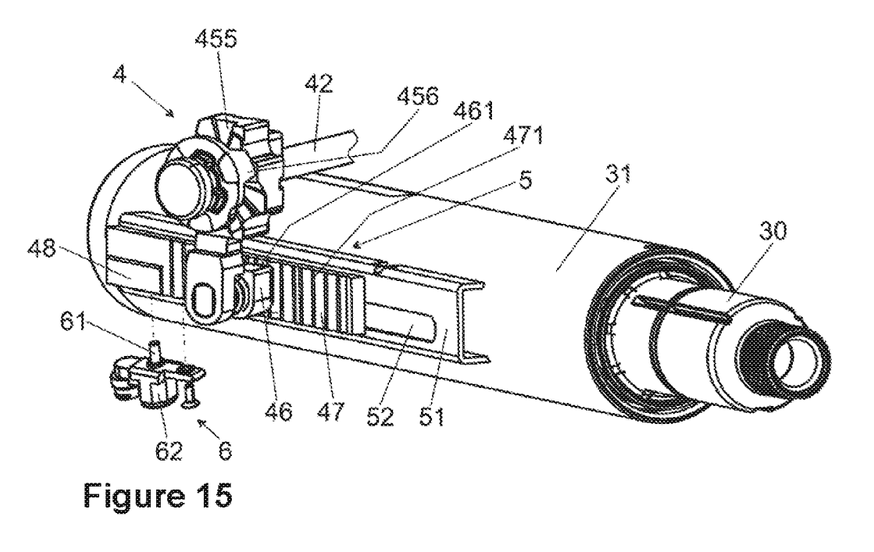
FIG. 15 is a detailed view of an example inner casing tube with an example clamping device and an example energy absorption device of another example steering column.

FIG. 15 shows a detail view of an inner casing tube 31 with a clamping device 4 and the energy absorption device 5 of a steering column in an alternative embodiment. The clamping device comprises a clamping bolt 42, which is connected in a rotationally fixed manner to a first cam disk 456. The first cam disk 456 can be connected in a rotationally fixed manner to a lever, not shown, wherein the first cam disk 456 interacts with a second cam disk 455 and a clamping movement is generated upon relative rotation of the first cam disk 456 with respect to the second cam disk 455, with the second cam disk 455 moving in the direction of the clamping axis. The second cam disk comprises an extension arm, a locking element 46 being connected to the extension arm. The locking element 46 comprises a toothing 461, which can be brought into engagement with a toothing 471 of the engagement part 47. According to the invention, the engagement part 47 comprises a connecting part 48. A coupling device 6 couples the engagement part 47 to the connecting part 48. Triggering of the coupling device 6 makes it possible to release the mechanical connection between the engagement part 47 and the connecting part 48, so that these can be separated from each other and be moved in the longitudinal direction independently of each other. The engagement part 47 is connected via an energy absorption device 5 to the casing tube 31. On the mutually facing sides transversely to the longitudinal axis L, the locking element 46 and the engagement part 47 have corresponding toothings 461 and 471 which can be brought into form fitting engagement with each other, having teeth running transversely to the longitudinal axis L and transversely to the clamping bolt 42.

Thanks to the invention, a steering column 1 can be provided with a single energy absorption device 5, enabling the activation of different crash levels, in an especially compact and economical manner with less manufacturing expense. As the coupling device 6 does not act directly on the connections between the engagement part 47 or the connecting part 48 and the energy absorption elements 56 or 54, an especially reliable function can be realized with a flexible utilization of the available installation space.

LIST OF REFERENCE NUMBERS

1 Steering column
2 Bracket
21 Fastening means
22, 23 Side cheeks
30 Steering spindle
31 (Inner) casing tube
32 End
33 (Outer) casing unit
4 Clamping device
41 Clamping lever
42 Clamping bolt
421 Spring
422 Cam
43 Oblong hole
44 Tilting pin arrangement
45 Support disk
46 Locking element
461, 471 Toothing
462 Cam track
47 Engagement part
472 Form-fitting opening
473 Fastening opening
474 Shear bolt
475, 485 Positioning element
476, 486 Driver element
48 Connecting part
482 Form-fitting opening
5 Energy absorption device
51 Holding profile
510 Form-fitting elements
52 Slot
53 Inner profile
54, 56 Energy absorption element
541, 561 First leg
542, 562 Bend
543, 563 Second leg
544, 564 Driver hook
545, 565 Engagement opening
546, 566 Abutment
6 Coupling device
61 Coupling element
62 Pyroelectrical actuator
L Longitudinal axis
H Vertical direction

The invention claimed is:

1. A steering column for a motor vehicle comprising:
an inner casing tube in which a steering spindle is mounted rotatably about a longitudinal axis;
an outer casing unit in which the inner casing tube is held, the outer casing unit being connectable to a body of the motor vehicle;
a clamping device, wherein in a fixing position the clamping device secures the outer casing unit relative to the inner casing tube, wherein in a release position the clamping device permits adjustment of the inner casing tube relative to the outer casing unit at least in a longitudinal direction, wherein the clamping device comprises a locking element that is supported in the longitudinal direction on the outer casing unit, wherein in the fixing position the locking element is non-displaceably connected in the longitudinal direction to an engagement part connected to the inner casing tube, wherein in the release position the locking element is released from the engagement part and permits relative movement between the inner casing tube and the outer casing unit in the longitudinal direction;
an energy absorption device that couples the inner casing tube and the outer casing unit, the energy absorption device comprising at least two energy absorption elements and a coupling device, wherein a first energy absorption element of the at least two energy absorption elements is configured to be coupled-in or coupled-out between the inner casing tube and the outer casing unit via the coupling device, wherein in a coupled-in state and in the fixing position of the clamping device the first energy absorption element is plastically deformable in an event of a relative displacement in the longitudinal direction between the inner casing tube and the outer casing unit,
wherein the engagement part comprises
a first driver element that is configured to be brought into operative engagement with the first energy absorption element, and
a connecting part that includes a second driver element that is configured to be brought into operative engagement with a second energy absorption element of the at least two energy absorption elements, wherein the coupling device connects in the longitudinal direction in a releasable manner the connecting part and a remainder of the engagement part.

2. The steering column of claim 1 wherein the coupling device comprises an actuator, which interacts with a movable coupling element, which is disposed between the connecting part and the remainder of the engagement part and upon activation of the actuator is movable for releasing the connecting part from the remainder of the engagement part.

3. The steering column of claim 2 wherein the engagement part and the connecting part have form-fitting elements with which the coupling element interacts.

4. The steering column of claim 1 wherein the coupling device comprises a pyroelectrical actuator.

5. The steering column of claim 1 wherein the remainder of the engagement part and the connecting part have positioning elements that are engageable with one another.

6. The steering column of claim 1 wherein the engagement part is connected by a predetermined breaking element to the inner casing tube.

7. The steering column of claim 1 comprising an energy absorption element configured as a U-shaped bending element that includes two legs joined together by a bend, wherein a first leg of the two legs is configured to be secured on the remainder of the engagement part or on the connecting part, wherein a second leg of the two legs is configured to be supported on the inner casing tube in the longitudinal direction.

8. The steering column of claim 7 wherein the U-shaped bending element is a first bending element, the steering column comprising a second bending element, wherein the two legs of the first bending element and legs of the second bending element are oriented equally in the longitudinal direction.

9. The steering column of claim 1 wherein at least two energy absorption elements are positioned in succession in the longitudinal direction.

10. The steering column of claim 9 wherein the at least two energy absorption elements are positioned in a common housing.

11. The steering column of claim 9 wherein the at least two energy absorption elements are positioned in a radially open C-shaped inner profile mounted on the inner casing tube.

12. The steering column of claim 11 wherein the at least two energy absorption elements are positioned in a common housing, wherein the housing is connected to the inner casing tube, wherein the common housing comprises a slot elongated in the longitudinal direction through which the first and second driver elements extend.

\* \* \* \* \*